Dec. 30, 1969     C. U. PEDDINGHAUS     3,486,590
SHOCK ABSORBER WITH MEANS TO PREVENT FOAMING
Filed April 11, 1968
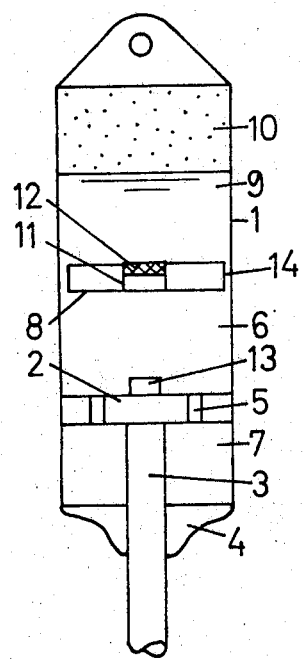
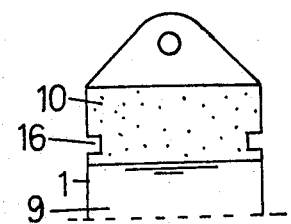
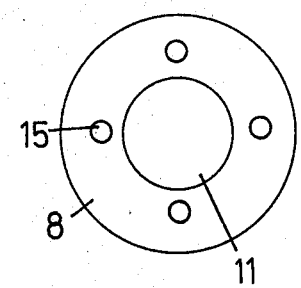
INVENTOR.
Carl Ullrich Peddinghaus

United States Patent Office

3,486,590
Patented Dec. 30, 1969

3,486,590
SHOCK ABSORBER WITH MEANS TO PREVENT FOAMING
Carl Ullrich Peddinghaus, 268 Obere Lichtenplatzer Strasse, 56 Wuppertal-Barmen, Germany
Filed Apr. 11, 1968, Ser. No. 720,540
Claims priority, application Germany, Apr. 15, 1967, P 41,905
Int. Cl. F16d 57/06
U.S. Cl. 188—88    5 Claims

ABSTRACT OF THE DISCLOSURE

A shock absorber in which a piston secured to a piston rod is displaceable within a cylinder, with the piston rod passing through one end of the cylinder. The piston is provided with valve ports whereby two damping liquid chambers of variable volume and one gas containing chamber are provided, with a displaceable disc being arranged between that end of the piston remote from the piston rod and the other end of the cylinder opposite thereto.

---

The invention relates to a shock absorber.

In a known shock absorber of the type under consideration, the displaceable disc has limited displacement between two stop rings provided in the interior of the cylinder. The disc cam, in this way, effect the smoothing of the liquid flow so that, for example, the formation of foam is minimized, but nevertheless the limitation of the movement of the disc imposes inevitably a limitation of the stroke of the piston. Consequently, a shock absorber provided with such a disc must be of such a length that the mentioned stroke limitation is compensated. The installation lengths for shock absorbers are, however, again limited in the case of power driven vehicles, so that the practicability of this known type of shock absorber is restricted.

Shock absorbers are also known which are constructed without the above mentioned limitation of movement. However, such shock absorber discs come to lie in the position of rest upon the piston, and upon the initial inward movement of the shock absorber piston can only detach themselves therefrom with difficulty. As a result of this, there is apt to be deformation of the disc, which may in turn lead to a seizing up upon the cylinder wall after long operating periods. Also discs are known which are provided with valves. These discs are in fact forced upwardly comparatively rapidly by the pressure liquid displaced by the piston rod, but are then practically unable to descend, so that the damping liquid chamber lying thereunder, in which there take place particularly turbulent flow conditions resulting from the piston velocity, is always comparatively large, so that the risk of foam formation upon the penetration of air cannot be avoided with any certainty.

As contrasted with this, the present invention has the basic purpose to provide a shock absorber of the type already referred to in the introduction, but which does not exhibit the above mentioned disadvantages. Above all the piston stroke shall not be limited, the damping liquid chamber involving turbulent flow shall be maintained as small as possible and the discs shall be protected from deformation.

This is essentially achieved in accordance with the invention in that the disc is provided with one or more ports for the free passage of the liquid and is so dimensioned that the flow of the liquid taking place in the range of frequencies encountered in power vehicles maintains the disc suspended in the liquid. In fact, the surprising result is achieved that upon the initial inward movement of the piston rod such a disc removes itself at once from the piston without deforming and is lifted up in the damping liquid. When the piston moves out, then the disc subsides downwardly for a short distance without having reached the liquid surface, but with a substantially reduced speed of descent as compared with the speed of ascent. Upon renewed inward movement of the piston, this process repeats itself so that the total result is a slightly oscillating condition of the disc in which it is in a position spaced from the liquid surface, which is determined essentially only by the existing travelling depth of the piston. In the case of a small travelling depth of the piston this spacing distance is large, which means that the disc floats at a distance slightly above the piston, while the spacing distance is somewhat smaller with increasing stroke length of the piston, so that the disc therefore floats at a substantially greater height above the piston.

By virtue of this automatic distance adjustment of the disc, that part of the damping liquid chamber which lies therebeneath and in which there exist particularly turbulent flow conditions, is maintained as small as possible so that therefore risk of foam formation is reduced to a disproportionately greater extent than was possible in the previously known types of construction. In fact, upon the first inward movement of the shock absorber piston, the disc is so much relieved of pressure that there is no longer any practical possibility of deformation even though the disc can be designed of comparatively light or thin walled construction. In the known types of disc on the other hand, in order to counteract any tendency to deformation, the disc had to be made of such wall thickness that its weight might finally prevent the disc being lifted at all. Because the disc according to the invention can assume any desired level in the damping liquid, any question of limiting the piston stroke is excluded.

As regards its natural weight and its flow resistance to the flow conditions existing in a shock absorber for power driven vehicles, the characteristics of the novel disc are precisely matched so that its dimensioning suits the purpose for which it is to be used.

A particularly advantageous feature of the disc according to the invention is that, in the range of power driven vehicle frequencies which are of technical importance, the disc assumes positions, which depend in practice only upon the piston stroke and not upon the frequency. This unusually constant behavior may be due in respect of the new disc to the fact that its coefficient of flow resistance is practically independent upon the Reynold's number. The flow velocity and the temperature-dependent viscosity of the damping liquid are therefore not able practically to influence the behavior of the novel disc. This feature is completely new because formerly it was only recognized that unperforated discs possess a resistance coefficient independent of a Reynold's number above 400, in contrast to which perforated discs would be expected to have a considerable dependence.

The invention will now be described with reference to a practical embodiment thereof illustrated in the accompanying drawing, wherein FIG. 1 represents a longitudinal section of a shock absorber with the disc in accordance with the invention, FIG. 2 shows a plan view of the novel shock absorber disc; and FIG. 3 is a fragmentary view of the upper part of the shock absorber embodying a stop arrangement.

The shock absorber according to FIG. 1 consists of a cylinder 1 in which there is displaceable piston 2 fixed to piston rod 3. Between the cylinder head 1 and the piston rod 3 there is provided sealing stuffing box 4. In the piston 2 there are provided valve ports 5, which can be closed by discs, or may have varying diameter. The piston 2 subdivides the cylinder volume into two chambers of varying space content 6 and 7, of which the upper chamber 6 is covered by a disc 8. Above the disc 8 there is situated a further damping liquid chamber 9, beyond whose bounding surface there is situated a pressure gas chamber 10.

The disc 8 is advantageously provided with a central depression 11 of pan shape extending to the side opposite to the piston. In this depression there is inserted a buffer disc 12 of a resilient material resistant to the pressure fluid. In this way it is ensured that the disc 8 cannot strike sharply upon a piston rod nut 13, so that the shock absorber can work smoothly even directly upon starting up. In so far as other parts of the disc 8 may be able to come in contact with the piston, the resilient buffer disc 12 may also be provided in such positions.

As is further shown in FIG. 1 the disc 8 has a peripheral collar 14 which ensures that it is guided free of canting.

In order to avoid the condition that the streams of liquid passing through the valve ports 5 of the piston 2 can penetrate without any deflection into the damping liquid chamber 9, it is preferable so as to arrange ports 15 provided in the disc 8 that they are at least partially staggered with respect to the valve ports 5 of the piston 2.

As is shown in FIG. 2 it is possible to provide the ports 15 so as to be arranged, for example, upon a circle concentric with the disc 8, whose diameter is smaller or larger than that of the valve ports 5. The arrangement of the disc ports 15 upon a concentric circle has the further advantage that the flow conditions obtaining at one side of the disc 8 have substantially radial symmetry. These flow conditions have a stabilizing effect upon the position of the disc so that they make a substantial contribution to ensuring that the disc 8 is guided without any canting.

The disc according to the invention can be manufactured with a very low production outlay. It may, for example, be produced without difficulty in a deep drawing process from metal sheet or by an injection process from a synthetic plastics material resistant to the pressure liquid. Because the disc is subject to no deforming stresses, it may also be designed with such wall thickness that its gravitational weight does not impair its hydraulic flow characteristics. The dimensional design of the disc will follow the already described requirements. Thus, a sheet metal disc of the type represented in FIG. 2 may be made with a wall thickness of 0.9 mm. and in which the height of the collar and the depth of the pan shaped impression could amount to 8.5 mm. and give a satisfactory result when provided with four bores of 4 mm. diameter, which are uniformly distributed upon a concentric circle of 32 mm. The outer diameter of the disc was in this case 46 mm. while the internal diameter of the pan shaped impression amounted to 18 mm. This disc consisting of steel sheet exhibited, when used in a conventional shock absorber and a conventional damping liquid, an exceptionally good flow characteristic. Similarly it has been proven to be satisfactory to employ a disc made of synthetic plastics material, but not provided with a central pan shaped depression and having a wall thickness of 2.4 mm. However, these dimensional data apply solely to one practical example. The materials used and the dimensions can be still further varied within the scope of the hydraulic flow requirements already described.

A further practical embodiment of the invention is represented in FIG. 3. In this figure there is shown the upper part of a shock absorber, which otherwise corresponds to the practical embodiment represented in FIGS. 1 and 2. In this case, the chamber 10 intended for accommodating the pressure gas is aagin formed by the upper part of the cylinder 1. In the internal wall of the cylinder 1 there is disposed a stop 16 for the disc 8, which stop may comprise, for example, an impressed circumferential corrugation or which may consist of indiivdually worked depressions. The positional height of the stop 16 is so chosen that the surface level of the damping liquid rises above the stop 16 at least when the piston rod has partly performed its inward stroke.

This practical embodiment is primarily intended for conditions of extreme stressing, in which the usual oscillation frequencies and amplitudes of power driven vehicles are exceeded, and in which the danger arises that the disc would always float above the surface level of the damping liquid. Nevertheless in this construction there is no limitation of the piston stroke because the compressed gas itself cannot be compressed to any desired extent even under extreme stressing condition. The damping piston 2 thus is forced to a level in the cylinder which still lies below the disc 8 when the latter is against the stop 16. Nevertheless it is essential in this construction also there shall be no lower limiting stop for the disc 8, because the provision of such a stop would constitute a material limitation of the stroke of the damping piston 2.

What I claim is:

1. A shock absorber including a cylinder, a gas containing chamber provided within the cylinder, a piston displaceable in the cylinder, a piston rod to which said piston is fixed, said piston rod extending through an end wall of the cylinder, said piston being provided with valve ports and dividing the cylinder into two chambers of variable volume for damping liquid, a freely displaceable disc within the cylinder located between that face of the piston remote from the piston rod and the oppositely located end face of the cylinder, said displaceable disc having a peripheral collar provided with one or more ports at least partially staggered with respect to the valve ports in the piston for the free passage of liquid and dimensioned such that within the range of frequencies enconutered during use, the flow conditions maintain said disc suspended in the damping liquid.

2. The shock absorber as claimed in claim 1 in which the gas containing chamber is located in the upper part of the cylinder, the inner wall of the cylinder being provided with a stop for said disc at such a level that the surface level of the damping liquid surmounts the stop at least with said piston rod partly retracted.

3. The shock absorber as claimed in claim 1, wherein the ports in the disc lie upon one or more circles concentric with the disc.

4. The shock absorber as claimed in claim 1, wherein the disc has a central buffer of resilient material at the side thereof facing the piston.

5. The shock absorber as claimed in claim 4, wherein the resilient buffer is inserted in a depression in the disc.

References Cited

UNITED STATES PATENTS

| 1,457,122 | 4/1923 | Ree. |
| 2,823,915 | 2/1958 | DeCarbon. |
| 2,856,035 | 10/1958 | Rohacs. |
| 3,164,381 | 1/1965 | Tuczek. |

OTHER REFERENCES

German printed publication 1,145,445, March 1963, Reuter.

GEORGE E. A. HALVOSA, Primary Examiner

U.S. Cl. X.R.

267—6; 188—100